United States Patent [19]
Lee

[11] Patent Number: 5,627,591
[45] Date of Patent: May 6, 1997

[54] IMAGE PROCESSING SYSTEM USING A PIXEL-BY-PIXEL MOTION ESTIMATION BASED ON FEATURE POINTS

[75] Inventor: Min-Sup Lee, Seoul, Rep. of Korea

[73] Assignee: Daewoo Electronics Co. Ltd., Seoul, Rep. of Korea

[21] Appl. No.: 527,613

[22] Filed: Sep. 13, 1995

[30] Foreign Application Priority Data

Aug. 8, 1995 [KR] Rep. of Korea .............. 95-24376

[51] Int. Cl.$^6$ .................................. H04N 7/36
[52] U.S. Cl. ........................ 348/416; 348/699
[58] Field of Search ....................... 348/413, 416, 348/699; H04N 7/36

[56] References Cited

U.S. PATENT DOCUMENTS 5,546,129   8/1996   Lee ............................ 348/416

*Primary Examiner*—Howard W. Britton
*Attorney, Agent, or Firm*—Pennie & Edmonds

[57] ABSTRACT

An apparatus, for use in a motion-compensated video signal encoder, for determining a predicted current frame based on a current frame and a previous frame, includes: a feature point motion vector detector for selecting a number of feature points among edge points in the previous frame and detecting a first set of motion vectors therefor; an edge point motion vector detector for detecting a second set of motion vectors for non-selected edge points; a quasi-point detector for detecting quasi-feature points and a third set of motion vectors, and quasi-edge points and a fourth set of motion vectors; a non-quasi-point motion vector detector for selecting one or more influential quasi-feature points for all non-quasi-points such that straight line drawn between each of the non-quasi-points and each of the corresponding one or more influential quasi-feature points intersects none of the quasi-feature and the quasi-edge points, and detecting a fifth set of motion vectors for the non-quasi-points; an arrangement block for arranging the third, the fourth and the fifth sets of motion vectors to determine a group of motion vectors for all of the pixels in the current frame; and a motion compensator for providing a pixel value from the previous frame based on a position of each pixel in the current frame and a motion vector thereof, to thereby determine the predicted current frame.

2 Claims, 4 Drawing Sheets

5,627,591

IMAGE PROCESSING SYSTEM USING A PIXEL-BY-PIXEL MOTION ESTIMATION BASED ON FEATURE POINTS

FIELD OF THE INVENTION

The present invention relates to an apparatus for encoding a video signal; and, more particularly, to an apparatus for encoding a video signal using a pixel-by-pixel motion estimation based on feature points.

DESCRIPTION OF THE PRIOR ART

As is well known, transmission of digitized video signals can deliver video images of a much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data through the limited channel bandwidth, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM (differential pulse code modulation), two-dimensional DCT (discrete cosine transform), quantization of DCT coefficients, and VLC (variable length coding). The motion compensated DPCM is a process of determining the movement of an object between a current frame and a previous frame, and predicting the current frame according to the motion flow of the object to produce a differential signal representing the difference between the current frame and its prediction. This method is described, for example, in Staffan Ericsson, "Fixed and Adaptive Predictors for Hybrid Predictive/Transform Coding", *IEEE Transactions on Communications*, COM-33, No. 12 (December 1985); and in Ninomiya and Ohtsuka, "A Motion-Compensated Interframe Coding Scheme for Television Pictures", *IEEE Transactions on Communications*, COM-30, No. 1 (January 1982).

Specifically, in the motion compensated DPCM, current frame data is predicted from the corresponding previous frame data based on an estimation of a motion between the current and the previous frames. Such estimated motion may be described in terms of two dimensional motion vectors representing the displacement of pixels between the previous and the current frames.

There have been two basic approaches to estimate the motion or displacement of pixels of an object: one is a block-by-block estimation; and the other is a pixel-by-pixel approach.

In the block-by-block motion estimation, a block in the current frame is compared with blocks in its previous frame until a best match is determined. From this, an interframe displacement vector (which indicates how much the block of pixels has moved between the frames) for the whole block can be estimated. However, in the block-by-block motion estimation, poor estimates may result if all pixels in the block do not move in a same way, to thereby decrease the overall coding efficiency.

In case of the pixel-by-pixel estimation, on the other hand, a displacement is determined for each and every pixel. Accordingly, this technique allows a more accurate estimation of pixel values and has the ability to easily handle scale changes (e.g., zooming, movement perpendicular to the image plane). However, in the pixel-by-pixel approach, since a motion vector is determined at each and every pixel, it is virtually impossible to transmit all of the motion vector data to a receiver.

One of the techniques introduced to ameliorate the problem of dealing with the surplus or superfluous transmission data resulting from the pixel-by-pixel approach is a feature point-based motion estimation method.

In the feature point-based motion estimation technique, motion vectors for a set of selected pixels, i.e., feature points, are transmitted to a receiver, wherein each of the feature points is defined as a pixel capable of representing its neighboring pixels so that motion vectors for non-feature points can be recovered or approximated from those of the feature points at the receiver.

In an encoder which adopts the motion estimation based on feature points, as disclosed in a copending commonly owned application, U.S. Ser. No. 08/367,520, entitled "Method and Apparatus for Encoding a Video Signal Using Pixel-by-Pixel Motion Estimation", a number of feature points are first selected from the pixels contained in the previous frame. Then, a first set of motion vectors for the selected feature points are determined, wherein each of the motion vectors represents a spatial displacement between one feature point in the previous frame and a corresponding matching point, i.e., a most similar pixel, in the current frame. The most similar pixel in the current frame is called a quasi-feature point. Thereafter, a second set of motion vectors for all of the pixels contained in the current frame is determined by using said first set of motion vectors, That is, one part of the second set of motion vectors for quasi-feature points is first determined by converting each of the first set of motion vectors; and the remaining part of the second set of motion vectors for non-quasi-feature points is determined by averaging the motion vectors for the quasi-feature points which are placed within a predetermined size of circular boundary.

Since the remaining part of the second set of motion vectors for non-quasi-feature points is determined without employing any actual information relative to the real motion of an object, it may not be able to accurately estimate the motion vectors for the non-quasi-feature points.

SUMMARY OF THE INVENTION

It is, therefore, a primary object of the invention to provide an improved video signal encoding apparatus using a pixel-by-pixel motion estimation based on feature points, which is capable of accurately estimating the motion vectors for non-quasi-feature points through the use of edge information.

In accordance with the invention, there is provided an improved apparatus, for use in a motion-compensated video signal encoder, for determining a predicted current frame based on a current frame and a previous frame of a digital video signal, comprising:

an edge detector for detecting edge points representative of pixels forming edges of an image in the previous frame;

a feature point detector for selecting a number of pixels among the edge points in the previous frame as feature points;

a feature point motion vector detector for detecting a first set of motion vectors for the feature points, each of the first set of motion vectors representing a spatial displacement between one of the feature points and a most similar pixel thereto in the current frame;

a range detector for determining a feature point range for each of the feature points, wherein the feature point range includes a feature point and one or more non-selected edge points lying on a same edge, and the distance along the edge between each of the non-selected edge points and the feature point within the feature point range is not greater than the distance along the edge between each of the non-selected edge points in the feature point range and a feature point in any other feature point range;

an edge point motion vector detector for detecting the distance between a feature point and each non-selected edge point in the feature point range and setting the distance as a search radius for said each non-selected edge point; and for determining, on a same edge, one or more feature point ranges dispersed within the search radius from each of the edge points, and detecting a second set of motion vectors for the non-selected edge points, each of the second set of motion vectors being determined by averaging the motion vectors of the feature points included in the one or more feature point ranges;

a quasi-point detector for detecting quasi-feature points in the current frame corresponding to the feature points and a third set of motion vectors for the quasi-feature points based on each of the first set of motion vectors and detecting quasi-edge points in the current frame based on each of the second set of motion vectors and a fourth set of motion vectors for the quasi-edge points;

a quasi-feature point selector for selecting one or more influential quasi-feature points for all non-quasi-edge and non-quasi-feature points such that a straight line drawn between each of the non-quasi-edge and non-quasi-feature points and each of the corresponding one or more influential quasi-feature points intersects none of the quasi-feature points and the quasi-edge points;

a non-quasi-point motion vector detector for detecting a fifth set of motion vectors for the non-quasi-edge and non-quasi-feature points, each of the fifth set of motion vectors being determined by averaging the motion vectors of the one or more influential quasi-feature points for each of the non-quasi-edge and non-quasi-feature points;

an arrangement block for arranging the third, the fourth and the fifth sets of motion vectors to determine a group of motion vectors for all of the pixels in the current frame; and a motion compensator for providing a pixel value from the previous frame based on the position of each pixel in the current frame and a motion vector thereof, to thereby determine the predicted current frame.

BRIEF DESCRIPTION OF THE DRAWINGS

The above and other objects and features of the present invention will become apparent from the following description of preferred embodiments when taken in conjunction with the accompanying drawings, in which.

DETAILED DESCRIPTION OF THE PREFERRED EMBODIMENTS

Figure 1:
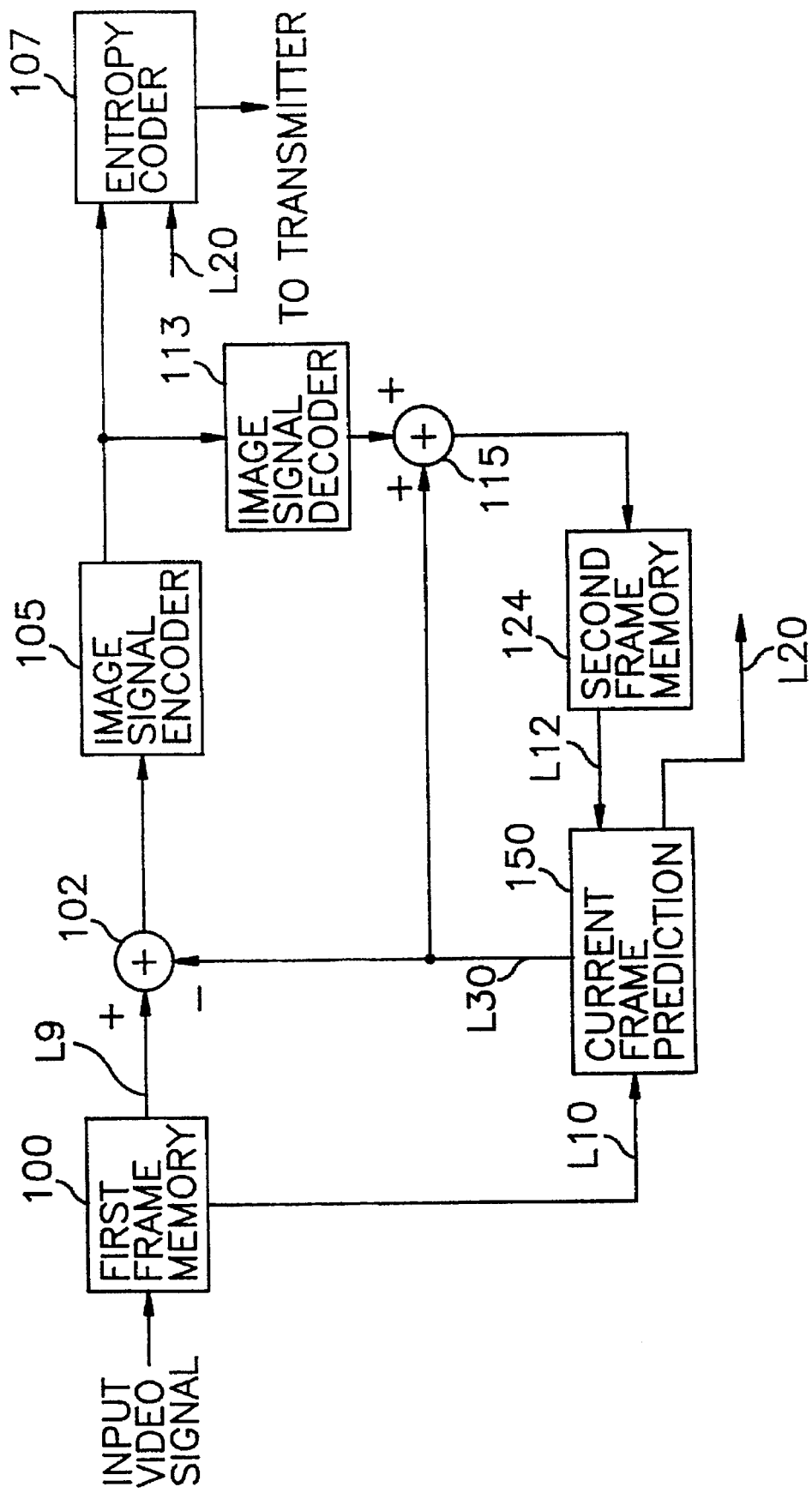
FIG. 1 is an image signal encoding apparatus having a current frame prediction block of the present invention.

FIG. 1 describes a preferred embodiment of the inventive image signal encoding apparatus. As shown in FIG. 1, a current frame signal of an input video signal is stored in a first frame memory 100 which is connected to a subtractor 102 through a line L9 and to a current frame prediction block 150 through a line L10.

In the current frame prediction block 150, a current frame signal on the line L10 retrieved from the first frame memory 100 and a reconstructed previous frame signal on a line L12 from a second frame memory 124 are processed to predict the current frame by using feature points to generate a predicted current frame signal onto a line L30 and a set of motion vectors for the feature points onto a line L20, respectively. Details of the current frame prediction block 150 will be described with reference to FIG. 2.

The predicted current frame signal on the line L30 is subtracted from the current frame signal on the line L9 at the subtractor 102, and the resultant data, i.e., an error signal denoting differential pixel values between the current and the predicted current frame signals, is dispatched to an image signal encoder 105, wherein the error signal is encoded into a set of quantized transform coefficients by using, e.g., a DCT and any of the known quantization methods. Thereafter, the quantized transform coefficients are transmitted to an entropy coder 107 and an image signal decoder 113. At the entropy coder 107, the quantized transform coefficients from the image signal encoder 105 and the motion vectors transmitted through the line L20 from the current frame prediction block 150 are coded together by using, e.g., a variable length coding technique. Thereafter, the coded signal is provided to a transmitter (not shown) for the transmission thereof.

In the meantime, the image signal decoder 113 converts the quantized transform coefficients from the image signal encoder 105 back to a reconstructed error signal by employing an inverse quantization and an inverse discrete cosine transform. The reconstructed error signal from the image signal decoder 113 and the predicted current frame signal on the line L30 from the current frame prediction block 150 are combined at an adder 115 to thereby provide a reconstructed current frame signal to be stored as a previous frame in the second frame memory 124.

Figure 2:
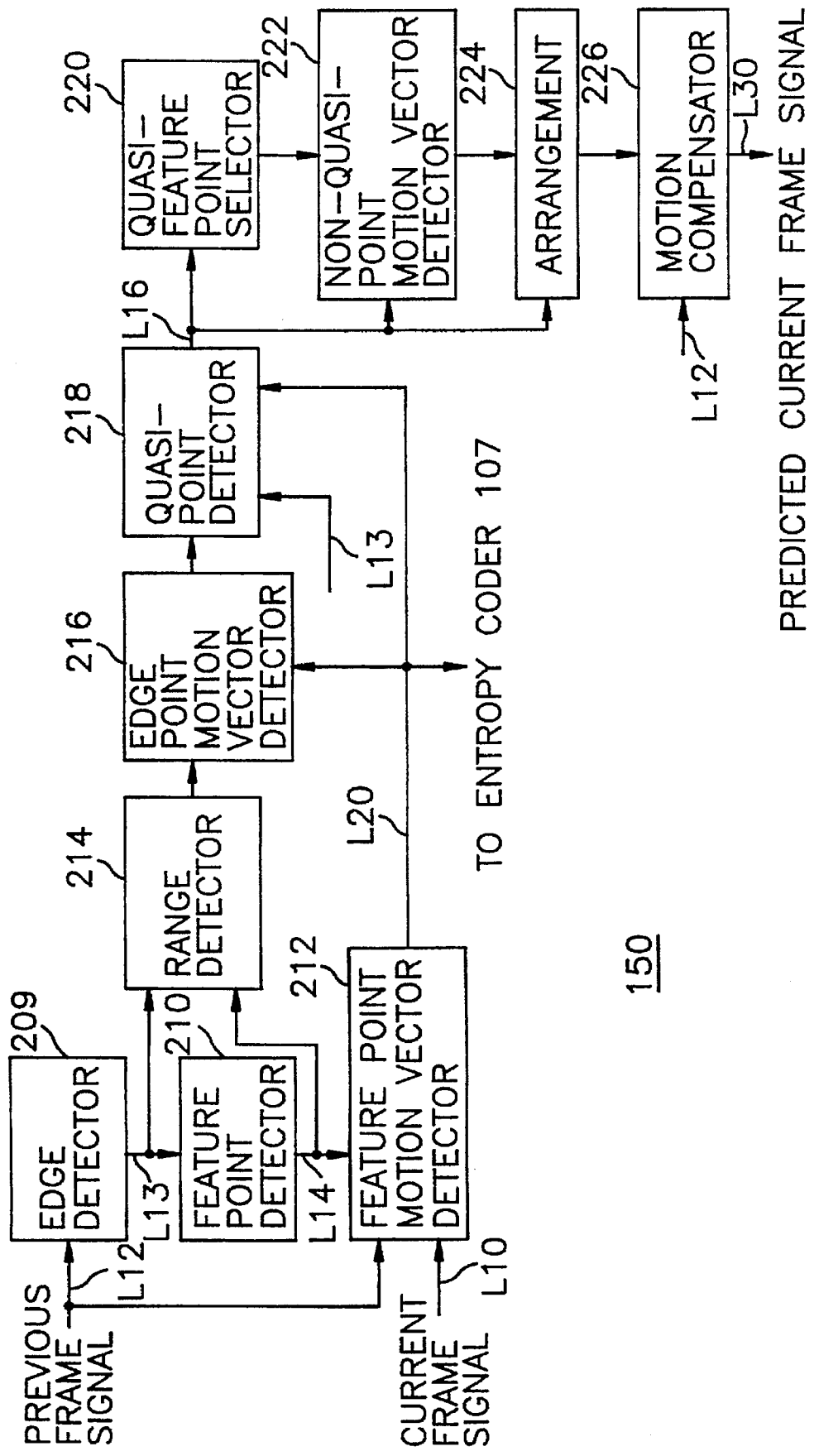
FIG. 2 shows a detailed block diagram of the current frame prediction block of FIG. 1.

Referring now to FIG. 2, there are illustrated details of the current frame prediction block 150 shown in FIG. 1. As shown in FIG. 2, a previous frame signal on the line L12 is provided to an edge detector 209 and a feature point motion vector detector 212, respectively. At the edge detector 209, a number of edge points representative of pixels forming edges of an image in the previous frame are detected through a conventional edge detection technique. The edge points in the previous frame are provided on a line L13 to a feature point detector 210, a range detector 214 and a quasi-point detector 218.

At the feature point detector 210, a plurality of feature points are detected among the edge points from the edge detector 209. In a preferred embodiment of the present invention, the feature points are detected at the intersection points of grid points and the edge points. The detection method is disclosed in a copending commonly owned application, U.S. Ser. No. 08/367,520, entitled "Method and Apparatus for Encoding a Video Signal Using Pixel-by-Pixel Motion Estimation", which is incorporated herein by reference in its entirely. The feature points from the feature point detector 210 are provided on a line L14 to the feature point motion vector detector 212 and the range detector 214.

At the feature point motion vector detector 212, a first set of motion vectors for the feature points is detected. Each of the first set of motion vectors represents a spatial displacement between a feature point in the previous frame and a most similar pixel thereto in the current frame called as a quasi-feature point. To detect a motion vector between a feature point and a quasi-feature point, there is used a block matching algorithm. That is, when a feature point is received from the feature point detector 210, a feature point block having the feature point at the center thereof, e.g., 5×5 pixels of the previous frame, is retrieved via the line L12 from the second frame memory 124 (shown in FIG. 1). Thereafter, the motion vector for the feature point block is determined after a similarity calculation between the feature point block and each of a plurality of equal-sized candidate blocks included in a generally larger search region, e.g., 10×10 pixels, of the current frame retrieved from the first frame memory 100 (shown in FIG. 1). The determined motion vector for the feature point block is assigned as the motion vector of the feature point contained in that feature point block.

After detecting the motion vectors for all of the feature points, the first set of motion vectors is provided to an edge point motion vector detector 216, a quasi-point detector 218 and the entropy coder 107 (shown in FIG. 1) via the line L20.

In the meantime, at the range detector 214, each of the edges having a number of feature points is divided into a corresponding number of feature point ranges by indexing, in each of the edges, every edge point to a feature point which is closest thereto along the edge.

Figure 3A:
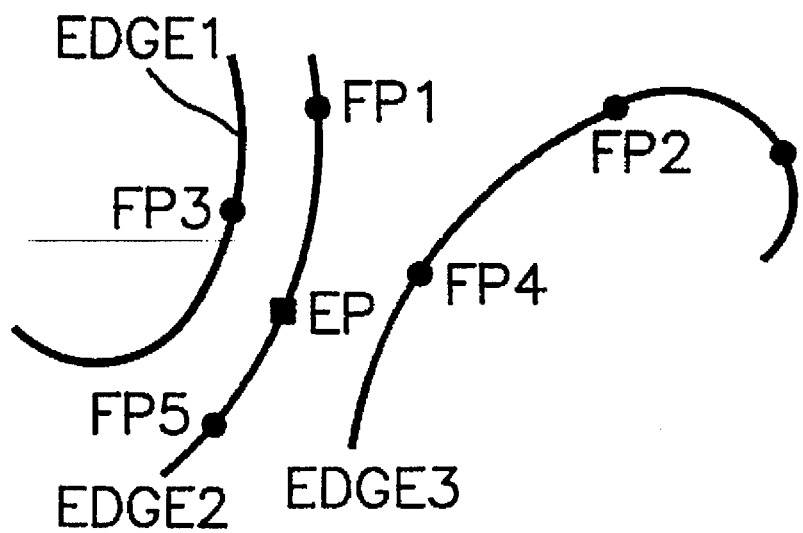
FIGS. 3A to 3C describe a method for determining the feature point ranges on each of the edges.
Figure 3B:
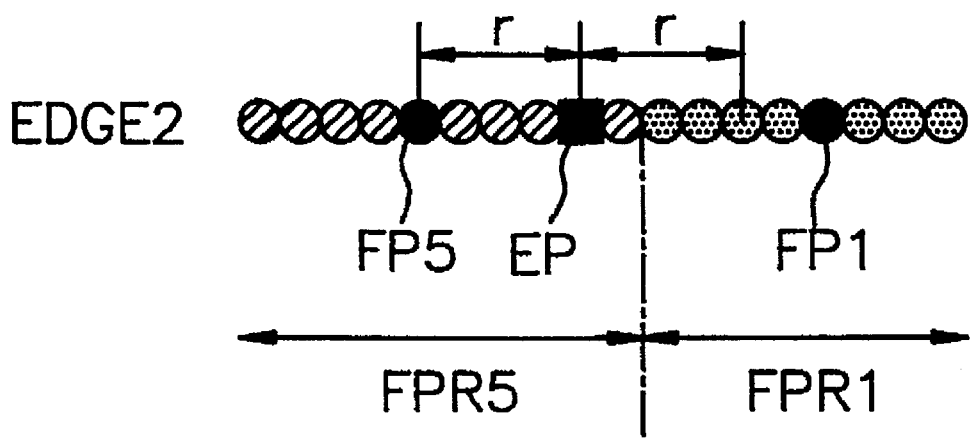
Figure 3C:
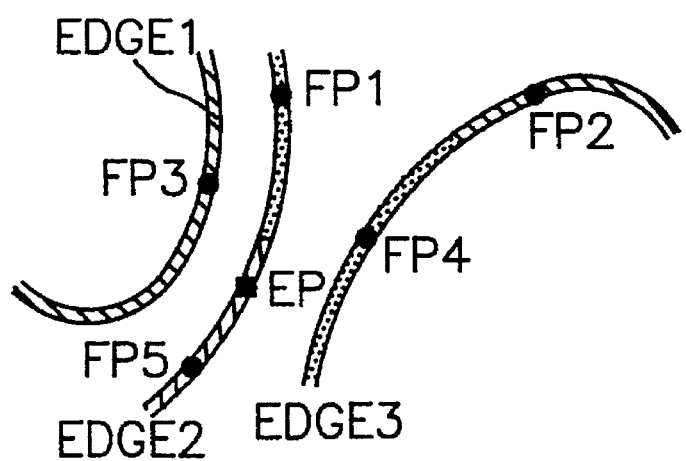

Referring to FIGS. 3A to 3C at this time, there is shown a method for determining the feature point ranges on each of the edges. As shown in FIG. 3A, in case that feature points, e.g., FP1 to FP5, are distributed along three edges EDGE 1, EDGE 2 and EDGE 3, an edge point EP on EDGE 2 is indexed to a feature point FP1 or FP5 depending on the degree of proximity therebetween. For instance, if the edge point EP is distanced from the feature points FP1 and FP5 by 5 and 3 pixels along the edge as shown in FIG. 3B, the edge point EP is indexed to the feature point FP5. In a similar manner, each of the edge points is indexed to a feature point which is closest thereto. If an edge point is disposed at the middle of two neighboring feature points, the edge point is indexed to either one of the two neighboring feature points. A feature point and edge points indexed thereto constitute a feature point range. In other words, each of the feature point ranges on an edge includes a feature point and one or more edge points, each of which having that feature point as a closest feature point thereto along the edge. Referring to FIG. 3C, there are illustrated feature point ranges on the edges EDGE 1, EDGE 2 and EDGE 3.

After determining the feature point ranges on each of the edges, range information representing a feature point range to which edge points belongs is fed to the edge point motion vector detector 216. The edge point motion vector detector 216 first determines a search radius, i.e., the distance between an edge point and a feature point in a same feature point range, and detects one or more influential feature points on the same edge and calculates a motion vector of the edge point based on the motion vector of the detected influential feature points. As shown in FIG. 3B, if the search radius of the edge point EP is r and edge points included in feature point ranges FPR 1 and FPR 5 on the same EDGE 2 are included within the range defined by the search radius r, the feature points FP1 and FP5 are determined as the influential feature points of the edge point EP. A motion vector $MV_{EP}$ for the edge point EP may be calculated as:

$$MV_{EP} = \frac{\sum_{j=1}^{M}\left(\frac{MV_j}{L_j} \times w_j\right)}{\sum_{j=1}^{M}\left(\frac{1}{L_j} \times w_j\right)} \quad \text{Eq. (1)}$$

wherein $MV_j$ is a motion vector for a jth feature point, M is the total number of feature point ranges in the range, $L_j$ is the distance between the jth feature point and the edge point EP; and $w_j$ is a weight factor for the jth feature point. If a given feature point is an influential feature point, the weight factor for the feature point is 1; and otherwise, 0. According to Eq. (1), the motion vector $MV_{EP}$ is determined by averaging the two motion vectors for the two feature points FP1 and FP5. The edge point motion vector detector 216 provides a second set of motion vectors for the edge points exclusive of the feature points.

Based on the edge point information from the edge detector 209 and the first and second sets of motion vectors from the motion vector detectors 212 and 216, the quasi-point detector 218 determines quasi-feature points and quasi-edge points in the current frame by shifting each of the feature points and the edge points by the motion vector thereof; and provides a third set of motion vectors for the quasi-feature points and a fourth set of motion vectors for the quasi-edge points. Since each of the first and the second sets of motion vectors represents the displacement between a pixel point in the current frame shifted from its corresponding pixel point in the previous frame, the magnitude of each of the motion vectors in the third and the fourth sets is identical to that of the corresponding motion vector in the first and second sets, except that the directions of the two motion vectors are opposite each other. The third and the fourth sets of motion vectors from the quasi-point detector 218 are provided via a line L16 to a quasi-feature point selector 220, a non-quasi-point motion vector detector 222 and an arrangement block 224.

Figure 4:
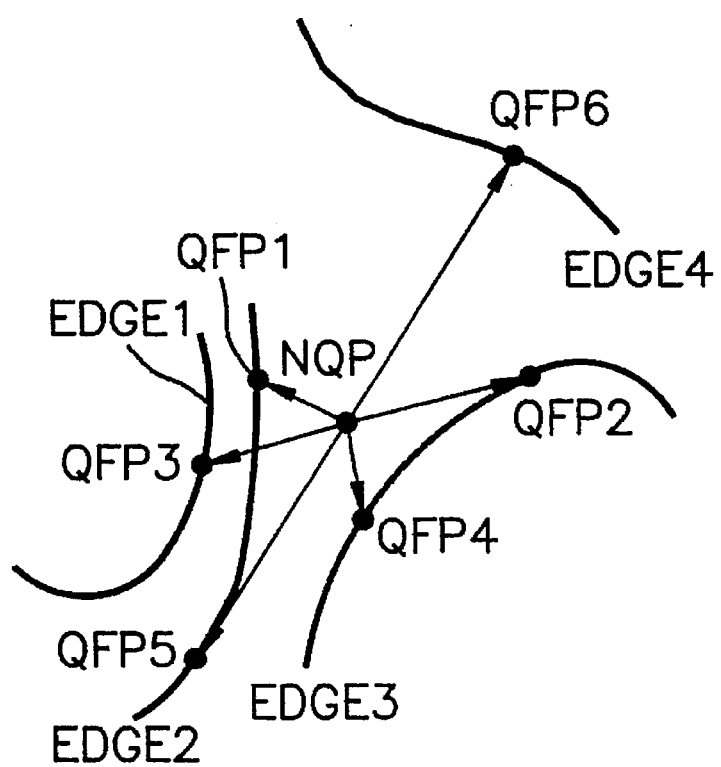
FIG. 4 represents a method for selecting one or more influential quasi-feature points for each of non-quasi-points.

The quasi-feature point selector 220 selects a number of influential quasi-feature points for each of the non-quasi-edge and non-quasi-feature points in the current frame. The non-quasi-edge and non-quasi-feature points represent all of the pixel points in the current frame excluding the quasi-edge points and the quasi-feature points; and, hereinafter, each of them shall be called as "a non-quasi-point". A plurality of influential quasi-feature points for a given non-quasi-point are selected out of all of the quasi-feature points such that straight lines drawn from the non-quasi-point to corresponding influential quasi-feature points do not intersect any reconstructed edges formed in the current frame by both the quasi-feature points and the quasi-edge points. For example, as shown in FIG. 4, if quasi-feature points, e.g., QFP1 to QFP6, are distributed along each of the four reconstructed edges EDGE 1, EDGE 2 EDGE 3 and EDGE 4, the quasi-feature points QFP1, QFP2, QFP4, QFP5, QFP6 are selected as the influential quasi-feature points for a non-quasi-point NQP, while the quasi-feature point QFP3 on EDGE 1 is excluded therefrom because EDGE 2 intervenes between the non-quasi-point NQP and the quasi-feature point QFP3. Referring back to FIG. 2, a number of influential quasi-feature points for each of the non-quasi-points are provided to the non-quasi-point motion vector detector 222.

At the non-quasi-point motion vector detector 222, a fifth set of motion vectors for the non-quasi-points are detected based on the influential quasi-feature point information from the quasi-point detector 218 and quasi-feature point selector 220. Each of the fifth set of motion vectors is determined by averaging the motion vectors for the influential quasi-feature points corresponding thereto. As shown in FIG. 4, for example, a motion vector $MV_{NQP}$ for the non-quasi-point NQP is calculated as:

$$MV_{NQP} = \frac{\sum_{i=1}^{N}\left(\frac{MV_i}{L_i} \times w_i\right)}{\sum_{i=1}^{N}\left(\frac{1}{L_i} \times w_i\right)} \quad \text{Eq. (2)}$$

wherein $MV_i$ is a motion vector for an ith quasi-feature point, N is the number of quasi-feature points in the current frame, $L_i$ is the distance between the ith quasi-feature point and the non-quasi-point NQP; and $w_i$ is a weight factor for the ith quasi-feature point. If the ith quasi-feature point is an influential quasi-feature point, the weight factor is 1; and otherwise, 0. The fifth set of motion vectors for the non-quasi-points is provided to an arrangement block 224.

The arrangement block 224 arranges the third set of motion vectors for the quasi-feature points, the fourth set of motion vectors for the quasi-edge points and the fifth sets of motion vectors for the non-quasi-points in order to determine a group of motion vectors for all of the pixels in the current frame. The group of motion vectors for all of the pixels in the current frame is sent to a motion compensator 226.

The motion compensator 226 provides a pixel value from the previous frame stored in the second frame memory 124 (shown in FIG. 1) based on the position data of each pixel in the current frame and a motion vector thereof, to thereby determine the predicted current frame.

While the present invention has been shown and described with respect to the particular embodiments, it will be apparent to those skilled in the art that many changes and modifications may be made without departing from the spirit and scope of the invention as defined in the appended claims.

What is claimed is:

1. An apparatus, for use in a motion-compensated video signal encoder, for determining a predicted current frame based on a current frame and a previous frame of a digital video signal, comprising:

means for detecting edge points representative of pixels forming edges of an image in the previous frame;

means for selecting a number of pixels among the edge points in the previous frame as feature points;

means for detecting a first set of motion vectors for the feature points, each of the first set of motion vectors representing a spatial displacement between one of the feature points and a most similar pixel thereto in the current frame;

means for detecting a second set of motion vectors for non-selected edge points in the previous frame by using the first set of motion vectors and the edge points;

means for detecting quasi-feature points in the current frame corresponding to the feature points and a third set of motion vectors for the quasi-feature points based on each of the first set of motion vectors and detecting quasi-edge points in the current frame based on each of the second set of motion vectors and a fourth set of motion vectors for the quasi-edge points;

means for selecting one or more influential quasi-feature points for all non-quasi-edge and non-quasi-feature points such that a straight line drawn between each of the non-quasi-edge and non-quasi-feature points and each of the corresponding one or more influential quasi-feature points intersects none of the quasi-feature points and the quasi-edge points;

means for detecting a fifth set of motion vectors for the non-quasi-edge and non-quasi-feature points, each of the fifth set of motion vectors being determined by averaging the motion vectors of said one or more influential quasi-feature points for each of the non-quasi-edge and non-quasi-feature points;

means for arranging the third, the fourth and the fifth sets of motion vectors to determine a group of motion vectors for all of the pixels in the current frame; and means for providing a pixel value from the previous frame based on the position data of each pixel in the current frame and a motion vector thereof, to thereby determine the predicted current frame.

2. The apparatus of claim 1, wherein said means for detecting the second set of motion vectors includes:

means for determining a feature point range for each of the feature points, wherein the feature point range includes a feature point and one or more non-selected edge points on a same edge, and the distance along the edge between each of the non-selected edge points and the feature point within the feature point range is not greater than the distance along the edge between each of the non-selected edge points in the feature point range and a feature point in any other feature point range;

means for detecting the distance between a feature point and each non-selected edge point in the feature point range and setting the distance as a search radius for said each non-selected edge point; and means for determining, on the same edge, one or more feature point ranges dispersed within the search radius from each of the edge points, and by averaging the motion vectors of the feature points included in said one or more feature point ranges, thereby to detect the second set of motion vectors for the non-selected edge points.

\* \* \* \* \*